(12) United States Patent
Liebman

(10) Patent No.: US 7,761,574 B2
(45) Date of Patent: Jul. 20, 2010

(54) MEDIA FILE ACCESS AND STORAGE SOLUTION FOR MULTI-WORKSTATION/MULTI-PLATFORM NON-LINEAR VIDEO EDITING SYSTEMS

(76) Inventor: Andrew Liebman, 140 Pleasant St., Brookline, MA (US) 02446

( * ) Notice: Subject to any disclaimer, the term of this patent is extended or adjusted under 35 U.S.C. 154(b) by 268 days.

(21) Appl. No.: 12/102,563

(22) Filed: Apr. 14, 2008

(65) Prior Publication Data
US 2008/0256242 A1     Oct. 16, 2008

Related U.S. Application Data

(63) Continuation-in-part of application No. 11/403,036, filed as application No. PCT/US2005/008968 on Mar. 18, 2005.

(60) Provisional application No. 60/554,272, filed on Mar. 18, 2004, provisional application No. 60/911,703, filed on Apr. 13, 2007.

(51) Int. Cl.
*G06F 15/16* (2006.01)
*G06F 12/00* (2006.01)
(52) U.S. Cl. ...................... 709/226; 709/217
(58) Field of Classification Search ............... 709/203, 709/217–219, 225–229
See application file for complete search history.

(56) References Cited
U.S. PATENT DOCUMENTS 6,321,219 B1 * 11/2001 Gainer et al. ................ 707/3
7,069,594 B1 * 6/2006 Bolin ........................ 726/26
7,610,219 B2 * 10/2009 Sayed ........................ 705/26
2002/0138843 A1 * 9/2002 Samaan et al. ............. 725/87
2006/0053442 A1 * 3/2006 Ridderheim et al. ........ 725/32
2007/0078768 A1 * 4/2007 Dawson ..................... 705/50

* cited by examiner

*Primary Examiner*—Zarni Maung
(74) *Attorney, Agent, or Firm*—Morse, Barnes-Brown & Pendleton, P.C.; Sean D. Detweiler, Esq.

(57) ABSTRACT

A novel system, method and computer program product for storing and enabling access to certain digital media files of pre-determined formats stored in a centralized media storage device. The system stores digital audio and video media files in a centralized fashion and enables access to one or more independent users via individual workstations. The method includes creating a directory structure on the storage means for hierarchically organizing the digital media and other data files; generating in the directory structure a User Directory that corresponds to each independent user that is capable of accessing said media files, and through which an independent user can store actual digital media files; enabling capturing and rendering of media files of a predetermined format into said directory structure, the media files adapted to be stored in one or more single sub-directory levels below an isolated root level of the directory structure; and, automatically creating for each subdirectory of the isolated route level directory structure, a corresponding link to the actual sub-directory location for one or more individual independent users, and placing the links inside each corresponding User Directory. In this manner, via said links, a user is permitted indirect access to all actual digital media files that are stored in the directory on said storage means, while preventing direct access to the actual digital media files.

13 Claims, 10 Drawing Sheets

Figure 5

MEDIA FILE ACCESS AND STORAGE SOLUTION FOR MULTI-WORKSTATION/MULTI-PLATFORM NON-LINEAR VIDEO EDITING SYSTEMS

CROSS-REFERENCE TO RELATED APPLICATIONS

This application is a continuation-in-part of U.S. Patent Publication No. 2006/0184673 based on Ser. No. 11/403,036 filed on Apr. 12, 2006, which is a continuation-in-part of co-pending PCT Patent Application No. PCT/US05/08968 filed Mar. 18, 2005 and entitled Novel Media File Access and Storage Solution For Multi-Workstation/Multi-Platform Non-Linear Video Editing Systems which claims the priority in U.S. Provisional Patent Application Ser. No. 60/554,272, filed Mar. 18, 2004 and entitled MEDIA FILE ACCESS AND STORAGE SOLUTION FOR MULTI-WORKSTATION/ MULTI-PLATFORM NON-LINEAR VIDEO EDITING SYSTEMS. The whole contents and disclosure of U.S. Patent Application No. 2006/0184673 is incorporated by reference as if fully set forth herein.

BACKGROUND OF THE INVENTION

1. Field of the Invention

The present invention generally relates to centralized shared storage systems for collaborative non-linear editing and manipulation of digital video and audio files.

2. Description of the Prior Art

Non-linear video and audio editing systems (NLE's) that can perform random access on the source material are typically set up on independent computer workstations having a means to input digital or analog audio and video as well as software for editing the inputted audio and video.

In such systems, video and sound (e.g., for film and television production) are digitized, or otherwise digital video is imported into the computer for storage on a hard disk or other storage media. Subsequently, the digital media can be manipulated with software such as, Avid's Xpress® Pro, Media Composer Adrenaline, or Liquid, Apple's Final Cut Pro, Boris's Media 100, Sony Vegas, Thompson-Grass Valley's Edius, and Adobe's Premiere Pro. Various editing tasks can then be performed on the imported video before it is saved, exported to another medium, or encoded for transfer to other storage media, e.g., a CD or DVD.

While a given television or film production facility may have multiple NLE workstations, the digital media files that are stored and accessed by each NLE—video files, audio files, graphics, stills, etc. —typically reside locally on that workstations' internal hard drives or on external hard drives that are directly attached to the workstation.

Several manufacturers offer products that allow multiple NLEs (often from the manufacturer's own product line) to be attached to a centralized storage network. Attaching NLEs to a common centralized storage network that every user and workstation can access vastly improves the efficiency of editing with NLEs and also allows a workflow that fosters collaboration and creativity. By storing media files in a centralized location, many editors can work simultaneously on the same project without having to duplicate the media files on each system. For example, in a news operation, a reporter can edit a story while an editor creates "coming up next promos" from the same material. In another example from the world of documentaries and feature films, new media files can be added to the system—captured—at one set of workstations while editors edit those files at another set of workstations. Similarly, one editor can tweak the sound for finished parts of the story while another editor works on parts of the story that still need to be edited. Thus, supervisors can review the work of subordinates while the subordinates continue working on a project. Furthermore, editors can use any workstation that's available—because the media files don't have to be directly attached to the workstation that happens to be available.

With all the advantages of attaching NLEs to a common centralized storage network, it would seem that every facility with two or more NLE systems would use centralized storage. However, the high cost of the currently available systems is a significant barrier for many owners of NLE systems. Furthermore, many commercial products that are marketed to provide centralized storage for collaborative editing and manipulation of video and audio files do not provide some key capabilities that users need.

Setting tip a comprehensive and effective "home grown," centralized storage system is not a practical alternative in many cases, because shared media files must be stored in such a way that the files are managed and kept safe from accidental erasure and so that the NLE workstations accessing those files do not come into conflict with one another.

For instance, Avid® Technology's products such as Xpress Pro and Media Composer Adrenaline (both Windows and Macintosh versions) scan all the media files they can see on the various storage devices that are accessible to the workstation and then create a database of the clips—writing the database files to the very same folders where the media files are found. If multiple workstations try to access the same media files folder over a network, each workstation will try to rewrite the database files—sometimes causing workstations to crash or corrupt each other's projects.

Another problem arises when capturing new media files onto a system using Xpress DV Xpress Pro, Adrenaline, etc. As new material is being captured from videotape, the digital audio and video media files are temporarily stored in a sub-folder called "Creating" and are given temporary names until the capture process is finished. If two or more workstations were capturing at the same time, each workstation would be storing temporary files in the same "Creating" subfolder and trying to give those files the same name—thus, causing a conflict.

Avid® Technology products are not the only NLEs that present such centralized storage difficulties. When working on other industry leading NLEs such as Apple's Final Cut Pro and Adobe Premiere Pro, if multiple users attempt to read and write the same media files on a simple networked volume there is a serious danger that media files can be accidentally— or even maliciously—erased to the detriment of some or all members of the group.

Recent changes in the capabilities of stand-alone NLE applications such as provided by Avid® Technology pertain to the use of the MXF (Multimedia Exchange Format) files. In older versions of these applications, Avid only supported its own OMF file format, all media files in a given volume (i.e., files with the extensions *.omf *.aif, and *.wav) had to be stored in a single directory one level down from the root level of a volume. For example, for a given storage volume "X", whether a local volume or a volume mounted over a network connection, Avid would require that all media files were stored as such:

X = Storage Volume (root level)
    /OMFI MediaFiles (directory where files had to be store)
        MediaFiles.omf
        MediaFiles.aif
        MediaFiles.wav
        MediaDatabaseFiles With the introduction of support for MXF files, Avid Technology opened the door to some new strategies to support collaboration by establishing a new directory hierarchy in which files can be stored. Most importantly, Avid's NLE application allows for multiple folders to be created at the level where media files must be located. The new directory hierarchy generally looks as follows:

```
X = Storage Volume (root level)
    /Avid MediaFiles (directory one level down from root level)
        /MXF (subdirectory two levels down)
            /1 (subdirectory three levels down)
                VideoFiles.mxf
                AudioFiles.mxf
                MediaDatabaseFiles
            /2 (subdirectory three levels down)
                VideoFiles.mxf
                AudioFiles.mxf
                MediaDatabaseFiles
``` and so on.

A standalone Avid NLE application working with MXF format files will have at least one subdirectory below the "MXF" directory, starting with the number "1". When the "1" directory gets to a certain number of files, Avid will create a "2" directory. And when the "2" directory gets full, Avid will create a "3" directory; and the process repeats. It is also possible for users to create directories with much higher numbers (for example, "456", "39876") and Avid will use those directories in a similar same way. It is also possible to put media files into subdirectories that have names (i.e., "john", "peter", "susan"). While the media files contained within directories with names that contain non-digit characters will be seen by the Avid NLE applications, Avid will not create or modify media database files within such directories.

It would be highly desirable to exploit these various NLE application characteristics, to provide a substantially improved and novel way of facilitating multiple NLE workstations to work with a common pool of media files.

SUMMARY OF THE INVENTION

The present invention is directed to an improved centralized collaborative storage system for video and audio non-linear editing systems and other devices (e.g., encoders and hardware or software that can record, playback, and/or access digital media files over a network), and, a method and computer program product that enable more efficient storage of and access to digital media stored in a centralized storage media that addresses special treatments provided by these applications of certain pre-determined file format types, e.g., MXF format.

It is a further object of the present invention to provide a novel centralized collaborative storage system for non-linear editing systems and other devices (e.g., encoders and hardware or software that can record, playback, and/or access digital media files over a network), a method and computer program product that implements a novel virtualization feature that enables a server to permit multiple NLE workstations and other devices to see and access the same media files (video, audio, graphics, etc.) stored in a central storage media while essentially providing each workstation or other device with its own space to operate in where it can write files without interference from or without disturbing other workstations or other devices.

It is a further object of the present invention to provide a novel centralized collaborative storage system for non-linear editing systems and other devices (e.g., encoders and hardware or software that can record, playback, and/or access digital media files over a network), a method and computer program product that implements a server side virtualization feature that enables a server to permit multiple NLE workstations and other devices to see and access the same media files.

In accordance with these objects, the present invention provides a centralized collaborative storage system for non-linear editing systems and other devices that implements an improved server side virtualization feature that enables a server to permit multiple NLE workstations and other devices to see and access the same media files (video, audio, graphics, etc.) stored in a central storage media providing each workstation or other device with its own space to operate in where it can write files without interference from or without disturbing other workstations or other devices.

In accordance with the foregoing objects and aspects of the invention, there is provided a novel system, method and computer program product for storing and enabling access to certain digital media files of pre-determined formats stored in a centralized media storage device. The system stores digital audio and video media files in a centralized fashion and enables access to one or more independent users via individual workstations.

The method includes creating a directory structure on the storage means for hierarchically organizing the digital media and other data files; generating in the directory structure a User Directory that corresponds to each independent user that is capable of accessing said media files, and through which an independent user can store actual digital media files; enabling capturing and rendering of media files of a predetermined format into said directory structure, the media files adapted to be stored in one or more single sub-directory levels below an isolated root level of the directory structure; and, automatically creating for each subdirectory of the isolated route level directory structure, a corresponding symbolic link to the actual sub-directory location for one or more other individual independent users, and placing the links inside each other's corresponding User Directory. In this manner, via said links, a user is permitted indirect access to all actual digital media files that are stored in the directory on said storage means, while making the digital media files appear to be located in a directory that is advantageously named and that may have a different name from the directory where the actual digital media files are stored.

The method furthermore includes a means of monitoring all User Directories for a particular User, changes made to the directories—e.g., the addition of any new subdirectories, the deletion of any subdirectories, or the change in name of any such subdirectories—and causing corresponding symlinked-directories to be added, subtracted, or renamed in other User Directories.

According to a further aspect of the invention, there is provided a complete tool for managing, via a Graphical User Interface (GUI), the centralized digital media storage system that stores digital media source data and edited data for multiple NLE workstations that implements the symbolic links virtualization feature according to the invention. This managing tool automatically creates the directory structure consisting of real directories and link directories inside each User Directory and enables the monitoring function for each User Directory.

Advantageously, the present invention may be implemented for other non-linear video editing applications, and operates to enable multiple editors to collaborate and share in video editing projects either with or without implementation of the virtualization feature. The current solution takes advantage of some new capabilities that Avid Technology has built into their standalone NLE applications, specifically capabilities that pertain to the use of the (Multimedia Exchange Format) files.

BRIEF DESCRIPTION OF THE DRAWINGS

The objects, features and advantages of the present invention will become apparent to one skilled in the art, in view of the following detailed description taken in combination with the attached drawings, in which:

FIG. 3 also specifically depicts a novel GUI 302 which functionality is initiated for enabling an administrator to add users to the system, specifying passwords, changing passwords, and removing users from the system;

FIG. 5 depicts the novel GUI 308 via which functionality is initiated for enabling an administrator to specify which particular users may have access to the Project Workspaces created via the interface of FIG. 4;

DETAILED DESCRIPTION OF THE PREFERRED EMBODIMENTS

Figure 1:
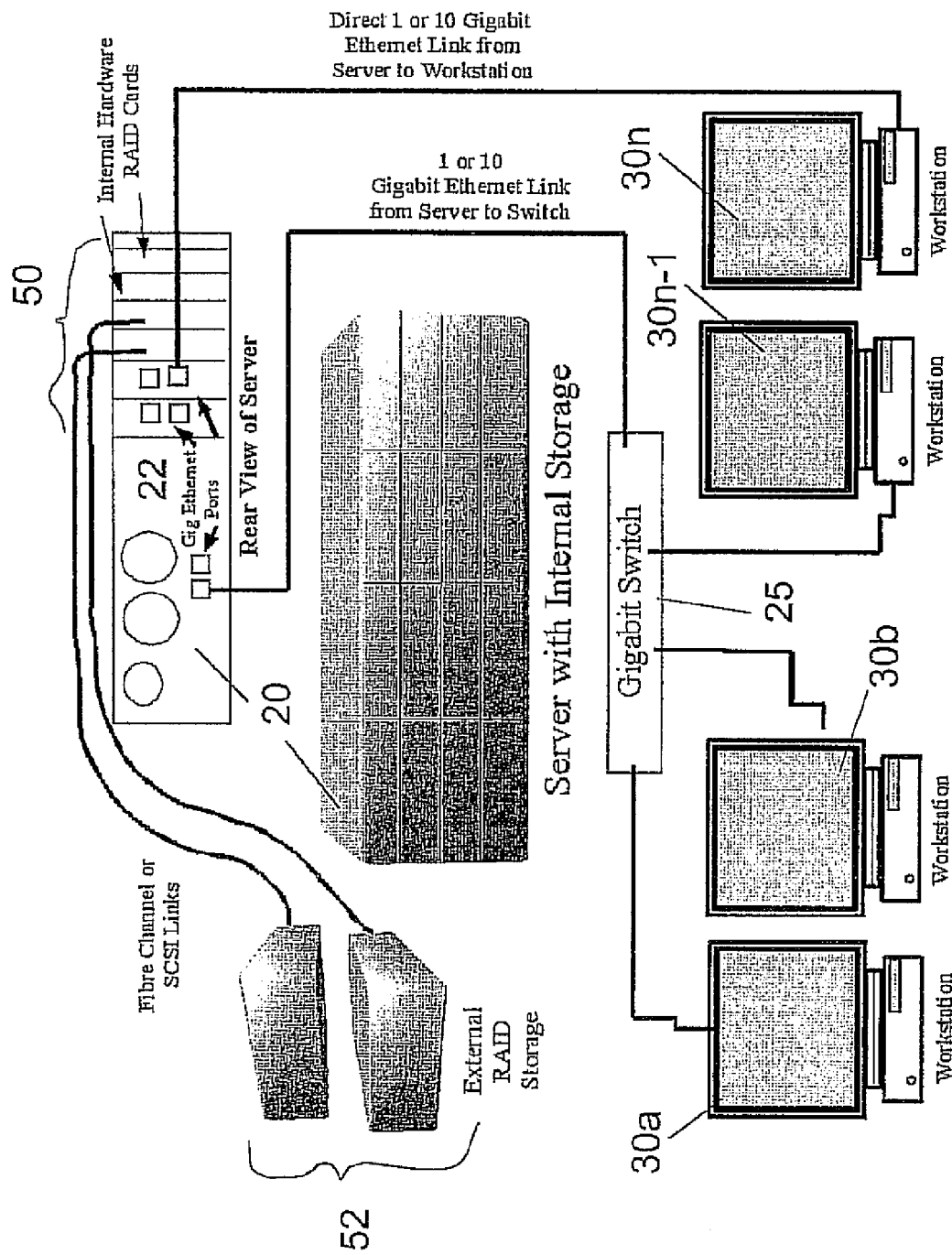
FIG. 1 depicts a base architecture and exemplary computer environment for implementing the server-side file virtualization feature according to the invention.

Applicant's co-pending United States Patent Publication No. 2006/0184673 describes a virtualization technique that allows independent workstations to see the same media files in a given centralized storage device but that enables each workstation to maintain its own media database files so that video nonlinear editing (NLE) applications, e.g., Avid NLE, do not come into conflict with one another. Furthermore, techniques were described that enables hiding of files created by one independent workstation from the view of other independent workstations so that other workstations won't get inconvenienced by the interruption that can come from seeing new files—an interruption that comes when one independent workstation, e.g., running an Avid NLE application, suddenly sees files that were created by another independent workstation running the same application, the former now needing to update its media database files to reflect the new files that have been added by the latter. As described in co-pending U.S. patent application Ser. No. 11/403,036, a file virtualization technique was implemented to permit two or more independent video NLE's applications to work together by providing a layer of protection for the media files (e.g., so that shared media files cannot be accidentally deleted by an individual workstation because the workstation does not directly access the media files).

The present invention describes a new solution that builds on the previous solutions but that takes advantage of some new capabilities that one video NLE application manufacturer, e.g., Avid Technology, has built into their standalone NLE applications, e.g., those specific capabilities that pertain to the use of the MXF (Multimedia Exchange Format) files.

Particularly, in accordance with the present invention, there is first set up a "media space" for Avid's MXF format files. After setting up the media space, further steps are performed including: creating a directory structure that allows each user/workstation to have his/its own "1" level directory; creating symbolic links (hereinafter "symlinks") in each user's MXF directory to every other user's/workstation's "1" level directory; and, advantageously naming the symlinks to avoid name conflicts (e.g., there can not be multiple "1" level subdirectories in the same directory, so the symlinks have to have different names. That is, the symlinks are advantageously named to prevent a user's Avid application from getting interrupted or being destabilized by the additions, changes and deletions to the contents of other user's "1" directories. The naming scheme chosen causes Avid's NLE, for example, to see what is in those directories but not attempt to change the contents in any manner or to scan the contents to build or modify the media database. While Avid's NLE application is prevented from making such changes simply by applying standard Linux permissions and Access Control Lists (ACLs), the naming scheme chosen will cause Avid's NLE application to not even attempt to make such changes— because if Avid tries to make such changes and then gets stopped by the Operating Systems (i.e., by getting a error), the application becomes unstable.

Furthermore, in accordance with the present invention, there is provided a "monitoring function" for each MXF directory such that if users or their Avid NLE applications create new subdirectories in the MXF directory (i.e., "2" or "3" or anything else), an appropriate symlink is automatically created in every other user's or workstations MXF directory; Moreover, via the "monitoring function" for each MXF directory, if users or their Avid applications re-name subdirectories in the MXF directory (i.e., change "1" to "2" or anything else), symlinks in other user's directories are appropriately automatically renamed.

In addition, there is provided an additional function to automatically set file and directory permissions and ownerships and ACLs such that one user cannot create, add to, delete, move or modify files in another user's directory. It is the automatic setting of these permissions that protects files from deletion or modification. According to the invention, the setting such permissions and ownerships and ACLs is a necessary condition for the system to work.

Figure 2:
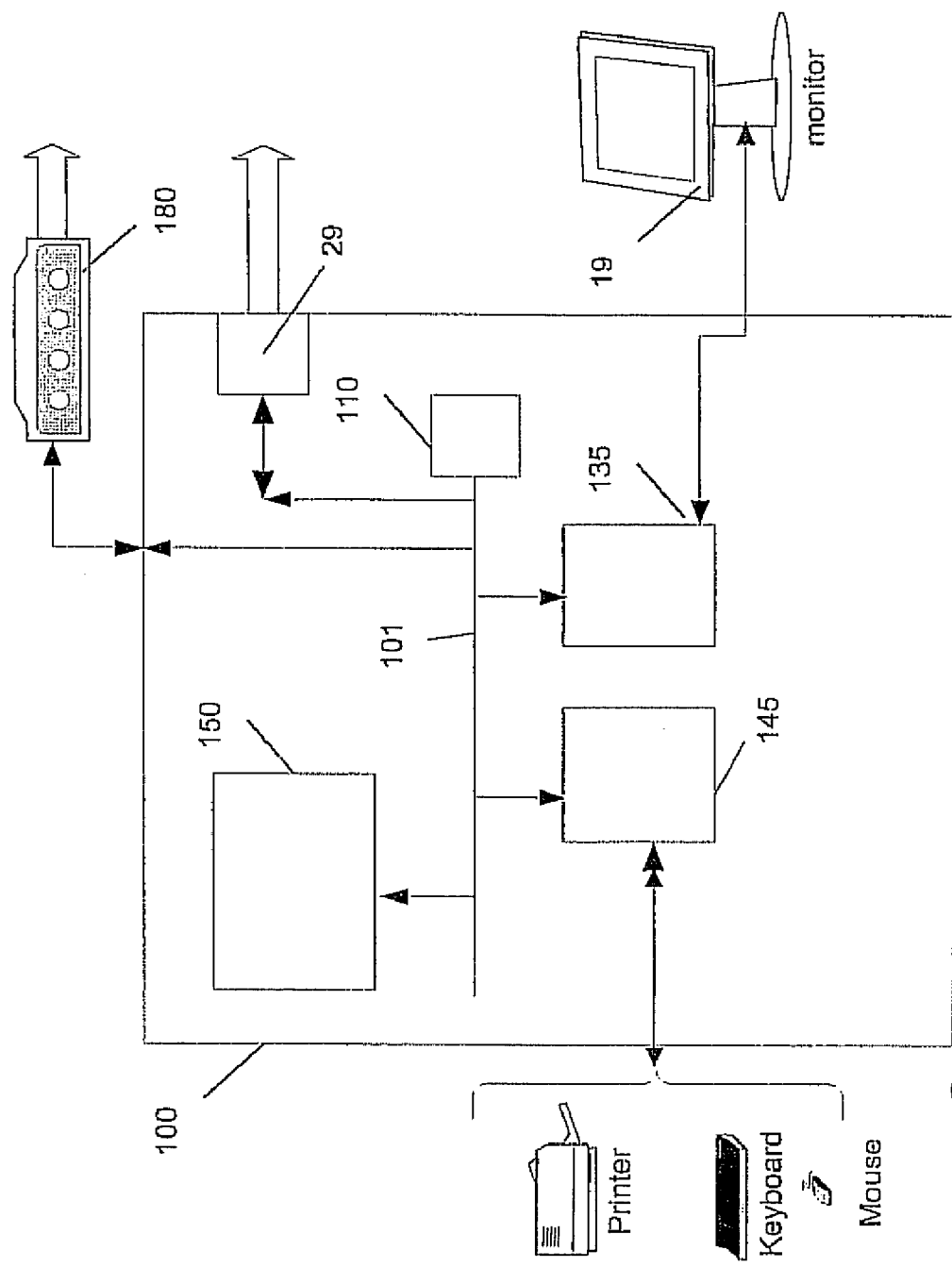
FIG. 2 depicts the configuration of a typical non-linear video editing (NLE) system workstation in communication with the server device of FIG. 1.

Referring now to drawings, and particularly to FIGS. 1 and 2, there is shown an example computing environment in which the present invention may be implemented. As will be described in greater detail herein, the file virtualization feature enables a server device 20 to permit multiple NLE workstations to see and access the same media files (video, audio, graphics, etc.) stored in a central storage media while essentially keeping each workstation isolated from the others (i.e., unaware that the others exist).

As shown in FIG. 1, the overall computing environment in which the present invention may be implemented includes a server device 20 connecting multiple video-editing client workstations 30*a*, 30*b*, . . . , 30*n* via a high speed network connection (e.g., Gigabit Ethernet or 10 Gigabit Ethernet). The media data can flow between the server 20 and the workstations via a switch device 25, through a direct Ethernet connection or other connection between server and workstation, or through a wireless connection. The server device 20 preferably includes one or more processor devices, e.g., an Intel Pentium4 or Xeon or an AMD Opteron, supporting processor speeds in excess of 2.4 GHz in the case of the Pentium4 and Xeon, 1.8 Ghz in the case of the Opteron. Furthermore, the server device 20 preferably includes 1 Gigabyte or more of RAM. In addition, the server 20 includes at least one high speed Ethernet port (preferably 1 Gigabit or higher). The server 20 also includes a means for storing digital media files and other data and preferably providing Terabytes of storage capacity, for example, a data storage subsystem 50 consisting of hardware RAID cards which are attached both to 32-bit PCI or 64-bit PCI/PCI-X/PCI-Express slots on the motherboard and to high-capacity internal hard drives (e.g., Serial ATA drives), and/or a data storage subsystem 52 consisting of external RAID arrays which are connected to Fibre Channel or SCSI Adapters which are also attached to 32-bit PCI or 64 bit PCI/PCI-X or PCI-Express slots on the server motherboard. More particularly, the data storage subsystem 50 may comprise storage media including, but not limited to, magnetic hard disk, optical storage drives, and even solid state disk and memory cards, etc. As would be known to skilled artisans, the hardware architecture may alternately comprise media access control devices configured to support IDE, SCSI, SAS, Fibre Channel, Firewire, and USB devices, protocols and topologies. Regardless of the storage media controller contemplated (e.g., SATA, SAS, IDE, or SCSI) it will control multiple storage media drives 52 configured in and/or connected to the server.

For purposes of discussion, in one embodiment, the centralized shared storage systems for collaborative non-linear editing and manipulation of digital video and audio files is configured with two 3ware (a unit of AMCC, San Diego, Calif.) 9000S-8 Hardware RAID cards each attached to eight 250 GB SATA hard drives. The server and its storage subsystem are connected to an Ethernet network. The switch device 25 enabling communications with each workstation 30*a*, 30*b*, . . . , 30*n* may comprise a Gigabit Workgroup Switch such as provided by SMC Networks® (Irvine, Calif.), enabling workstations to function at full Gigabit speeds with a Gigabit Ethernet adapter 29 having integrated Gigabit Ethernet MAC and PHY layer functions.

The server 20 with its storage subsystem 50, 52 and connections to an Ethernet network, preferably, run the Linux operating system (or, equivalently running a Unix or like Unix variant operating system—including Apple's OS X—which can run the software and hardware as described hereinbelow). The switch device 25 enabling server communications with each workstation 30*a*, 30*b*, . . . , 30*n* may comprise a Gigabit network switch device such as provided by SMC (Irvine, Calif.) that supports "Gigabit over Copper" Ethernet as well as "Jumbo Frames" (defined by a packet size or Maximum Transmission Unit—MTU—of 9000). This enables workstations 30*a*, 30*b*, . . . , 30*n* to function at full Gigabit speeds over Ethernet cables 60 that allow for maximum data throughput over the network and minimum use of CPU resources both by the server and workstations in order to support network transactions. It is assumed that the server device 20 includes at least two Gigabit Ethernet network adapters 22 having integrated Gigabit Ethernet MAC and PHY layer functions. Such a system—along with the storage subsystem diagramed—allows for sufficient data transfer between the server and workstations to support at least 10 NLE workstations or other capable hardware such as, but not limited to, encoders, playout servers, and video recorders that play from and record to devices such as hard drives simultaneously accessing media files on the storage subsystem.

As shown in FIG. 2, with respect to the workstations 30*a*, 30*b*, . . . , 30*n* which would be connected to the centralized shared storage systems for collaborative non-linear editing and manipulation of digital video and audio files, each comprises a computer system 100, including one or more processors or processing units 110, a system memory 150, and a bus 101 that connects various system components together. For instance, the bus 101 connects the processor 110 to the system memory 150. The bus 101 can be implemented using any kind of bus structure or combination of bus structures, including a memory bus or memory controller, a peripheral bus, an accelerated graphics port, and a processor or local bus using any of a variety of bus architectures such as ISA bus, an Enhanced ISA (EISA) bus, and a Peripheral Component Interconnects (PCI) bus or like bus device. Additionally, the computer system 100 includes one or more monitors 19 and, operator input devices such as a keyboard, and a pointing device (e.g., a "mouse") for entering commands and information into computer, data storage devices, and implements an operating system such as Linux, various Unix, Macintosh, MS Windows OS, or others.

The computing system 100 additionally includes: computer readable media, including a variety of types of volatile and non-volatile media, each of which can be removable or non-removable. For example, system memory 150 includes computer readable media in the form of volatile memory, such as random access memory (RAM), and non-volatile memory, such as read only memory (ROM). The ROM may include an input/output system (BIOS) that contains the basic routines that help to transfer information between elements within computer device 100, such as during start-up. The RAM component typically contains data and/or program modules in a form that can be quickly accessed by processing unit. Other kinds of computer storage media include a hard disk drive (not shown) for reading from and writing to a non-removable, non-volatile magnetic media, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM, or other optical media. Any hard disk drive, magnetic disk drive, and optical disk drive would be connected to the system bus 101 by one or more data media interfaces (not shown). Alternatively, the hard disk drive, magnetic disk drive, and optical disk drive can be connected to the system bus 101 by a SCSI interface (not shown), or other coupling mechanism. Although not shown, the computer 100 can include other types of computer readable media. Generally, the above-identified computer readable media provide non-volatile storage of computer readable instructions, data structures, program modules, and other data for use by computer 100. For instance, the readable media can store an operating system (O/S), one or more application programs, such as video editing client software applications, and/or other program modules and program data for enabling video editing operations via Graphical User Interface (GUI).

Input/output interfaces 145 are provided that couple the input devices to the processing unit 110. More generally, input devices can be coupled to the computer 100 through any kind of interface and bus structures, such as a parallel port, serial port, universal serial bus (USB) port, etc. The computer environment 100 also includes the display device 19 and a video adapter card 135 that couples the display device 19 to the bus 101. In addition to the display device 19, the computer environment 100 can include other output peripheral devices, such as speakers (not shown), a printer, etc. I/O interfaces 145 are used to couple these other output devices to the computer 100.

As mentioned, computer system 100 is adapted to operate in a networked environment using logical connections to one or more computers, such as the server device 20 that may include all of the features discussed above with respect to computer device 100, or some subset thereof. It is understood that any type of network can be used to couple the computer system 100 with server device 20, such as a local area network (LAN), or a wide area network (WAN) 99a (such as the Internet). When implemented in a LAN networking environment, the computer 100 connects to local network 99a via a network interface or adapter 29 that support the above-mentioned Gigabit over Copper Ethernet as well as Jumbo Frames. When implemented in a WAN networking environment, the computer 100 connects to the WAN 300 via a high speed cable/dsl modem 180 or some other connection means. The cable/dsl modem 180 can be located internal or external to computer 100, and can be connected to the bus 101 via the I/O interfaces 145 or other appropriate coupling mechanism. Although not illustrated, the computing environment 100 can provide wireless communication functionality for connecting computer 100 with remote computing device, e.g., an application server 20 (e.g., via modulated radio signals, modulated infrared signals, etc.).

In the networked environment, it is understood that the computer system 100 can draw from program modules stored in a remote memory storage devices (not shown) in a distributed configuration. However, wherever physically stored, one or more of the application programs executing the non-linear video editing system of the invention can include various modules for performing principal tasks. For instance, the application program can provide logic enabling input of video source data for storage as media files in the centralized data storage system and/or performing the video editing techniques thereon. Other program modules can be used to implement additional functionality not specifically identified here.

It should be understood that other kinds of computer and network architectures are contemplated. For example, although not shown, the computer system 100 can include hand-held or laptop devices, set top boxes, programmable consumer electronics, playout servers, video encoders, video recorders that play from and record to devices such as hard drives, mainframe computers, etc. However, it is understood that the computing environment 100 can employ a distributed processing configuration. In a distributed computing environment, computing resources can be physically dispersed.

Figure 3:
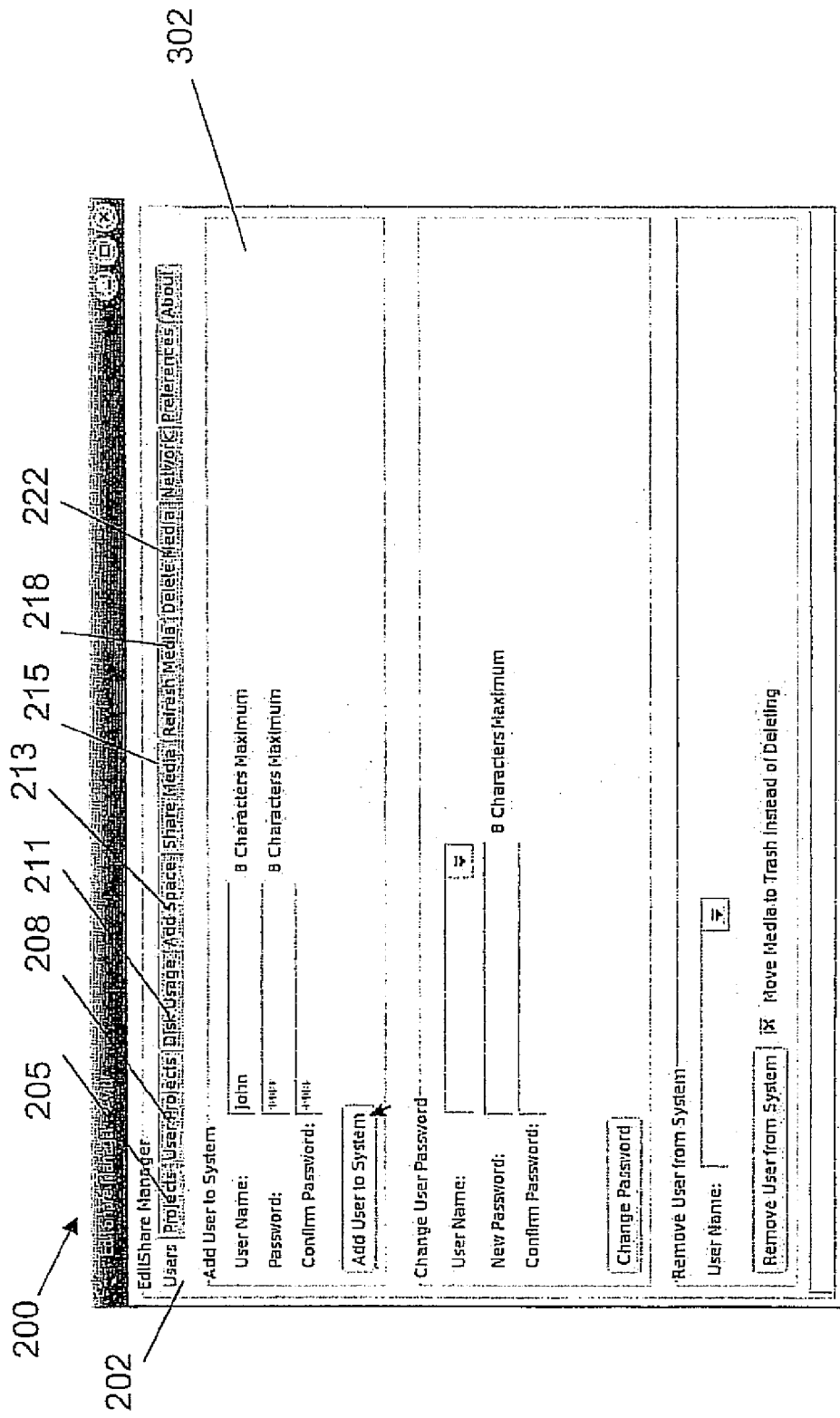
FIG. 3 in general depicts a novel GUI 200 via which functionality is initiated for enabling management of the centralized shared storage systems for collaborative non-linear editing and manipulation of digital video and audio files according to a further aspect of the invention.
Figure 4:
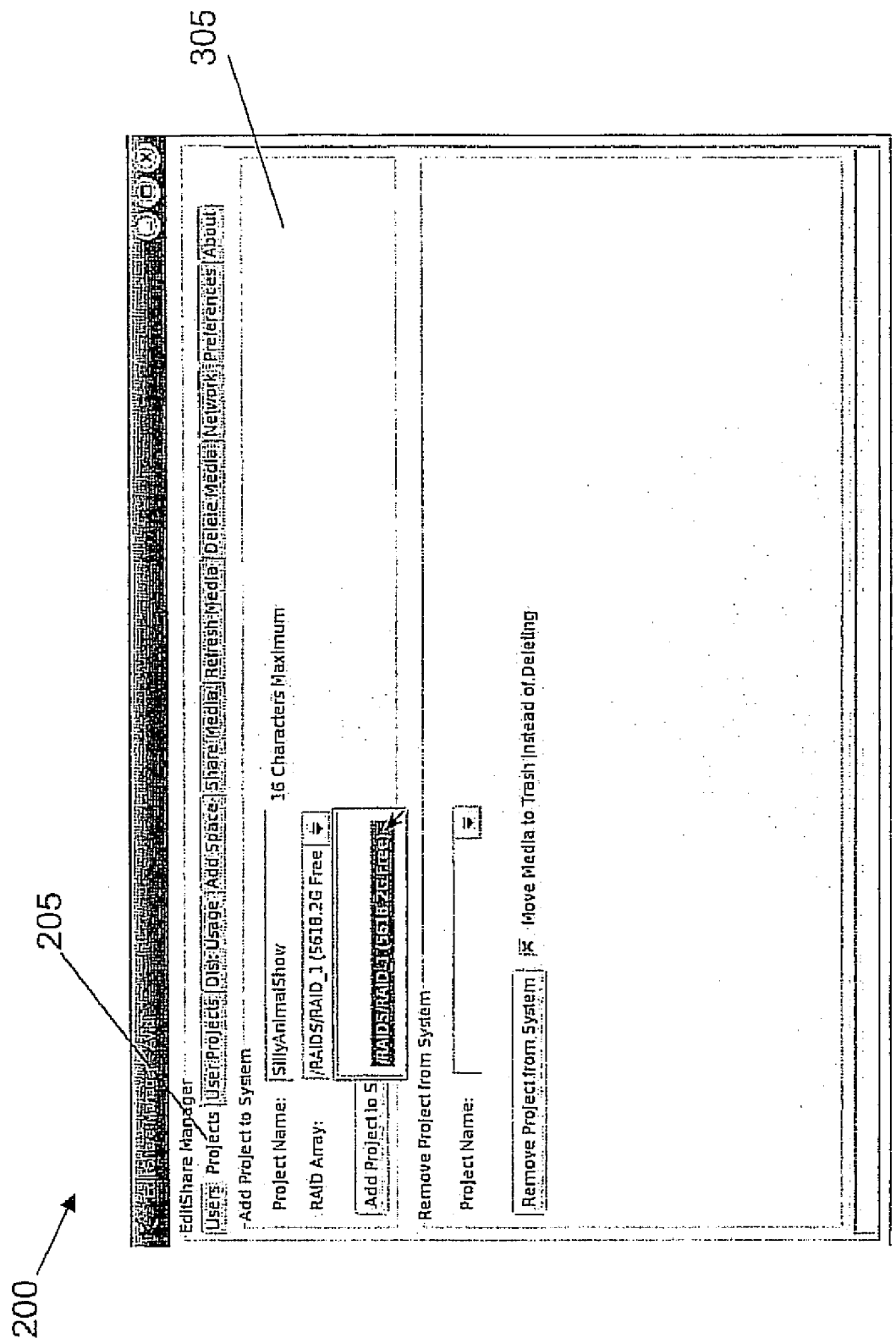
FIG. 4 depicts a novel GUI 305 via which functionality is initiated for enabling an administrator to define various logical Project Workspaces where digital media files can be stored according to a further aspect of the invention.
Figure 5:
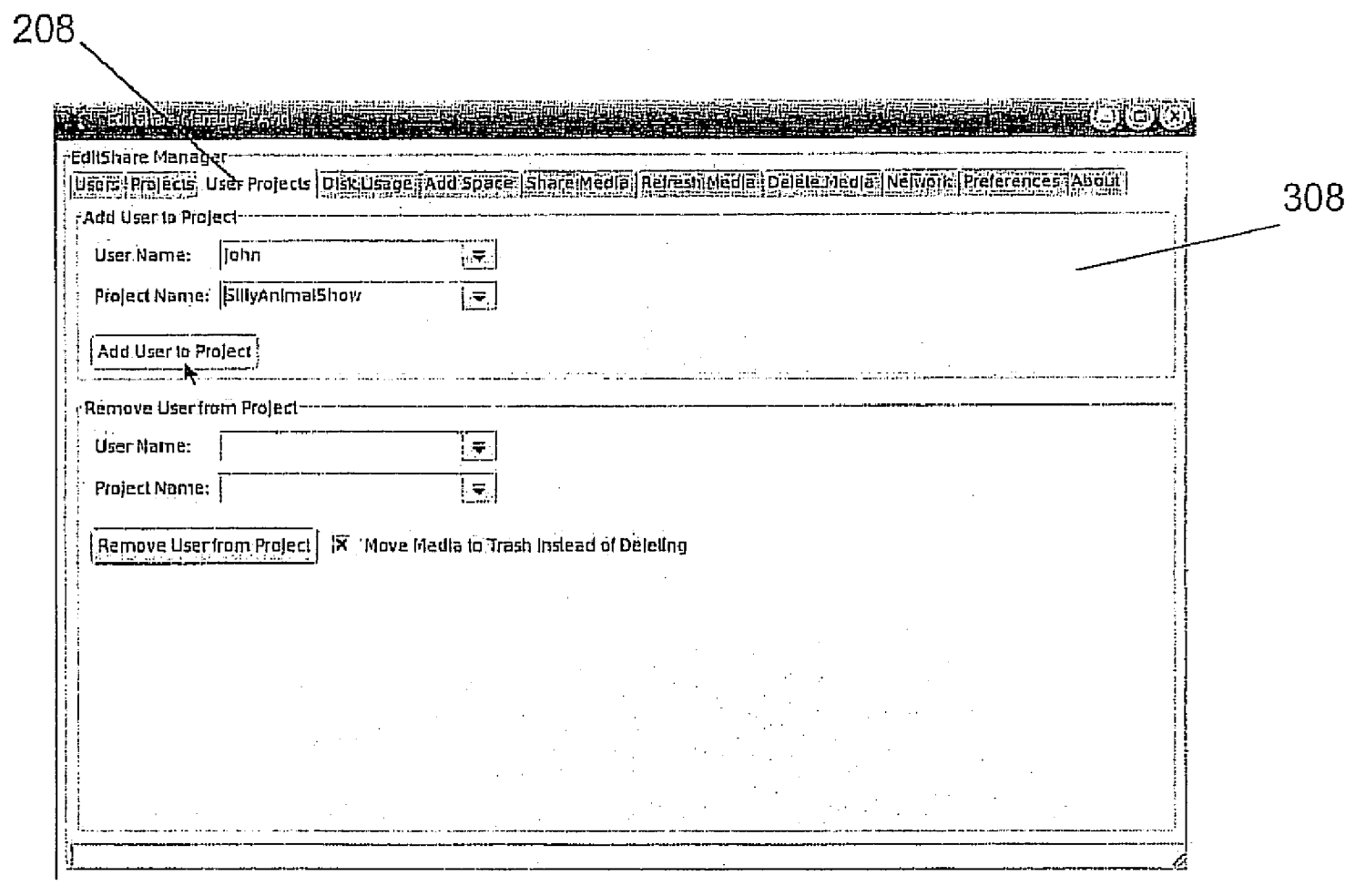

In accordance with another aspect of the invention described in Applicant's co-pending United States Patent publication No. 2006/0184673, as now described herein with respect to FIGS. 3-5, the executable program on server 20 providing the file virtualization feature of the invention additionally provides a novel Graphical User Interface (GUI) for initiating functionality for managing the centralized storage system 50. For instance, in a further embodiment of the invention, the software may be used to add a Project Workspace, alternately referred to herein as a Media Space, to the system. For instance, the software implements functionality for generating a display interface 200 such as shown in the example GUI 200 of FIG. 3, that provides a series of tabs providing an interface for enabling the following media management functions that include, but are not limited to: adding a user to the system via tab 202; creating a Project Workspace to the system and designating a specific RAID array on which to put it via tab 205; adding users to a Project Workspace via tab 208; determining Project Workspace usage status via tab 211; specifying allocation of disk storage space for a project or Project Workspace via tab 213; sharing media files via a tab 215; refreshing media files via tab 218; deleting media files via a tab 222; extending the physical space available for a Project Workspace by expanding the Project Workspace onto an additional RAID array via tab 213. Moreover, this aspect of the invention will enable an administrator to chose what type of NLE system will be the main type to work on the project, i.e., configure the system to configure the proper sub-directories.

Specifically, selection of the tab 202 enables an interface 302 such as shown in FIG. 3 enabling the addition of users to the system. In order for one or more independent users to store media on the system, and then access their own media as well as access media that has been stored by others, it is first desirable to add those users to the system so that they have a username and password on the server and so that the server can authorize them to access any and all resources that the specific user is authorized to access. This is accomplished by an administrator who can enter the user's name as well as the user's password in the respective entry fields shown in the GUI 302. In the same operation, this feature adds the same username and password to the authorized Samba (or Windows networking) users list.

It is further understood that, via the GUI 302 shown in FIG. 3, functionality is provided that enables a user to be removed from the system. This feature, while preferably only accessible to an administrator, removes a username and password from the Linux (or Unix) system. In the same operation, this feature removes the same username and password from the an authorized Samba (Windows networking) users list. Thus, via the GUI display 302 illustrated in FIG. 3, there is caused for display a dropdown list of existing users that may be selected, for example, by highlighting, and, provides a clickable button that when selected removes the user from the system. When the button is clicked, the username and password is also removed from the Linux (Unix) OS, and further, removes the user and password from the Samba users list (not shown). Moreover, this feature implements functionality for deleting all directories or folders associated with that user.

Referring back to FIG. 3, selection of the tab 205 generates an interface 305 such as shown in FIG. 4, enabling an administrator to specify RAID array where different Project Workspaces can be defined. These are upper-level directories into which organizations of one or more independent users can place digital media files and other data files which are in some way related to one another. While, creating multiple Project Workspaces is not strictly necessary in order to implement the present invention, creating multiple Project Workspaces makes it easier to manage media files when groups of files are no longer wanted. For instance, the entire Project Workspace can be deleted—thus deleting all of the files contained within—while leaving untouched all media files in other Project Workspaces. Additionally, by providing the means to create multiple Project Workspaces, the system enables an administrator to designate that one Project Workspace may be accessed only by a particular group of users while other Project Workspaces may be accessed only by other particular groups of users. Thus, via the GUI 305, as illustrated in FIG. 4, an administrator is not only able to create distinct Project Workspaces, but they are also able to designate on which storage volume or RAID array the Project Workspace will be created. Thus, via GUI 305, a user may enter a Project Workspace name, designate a RAID array, and click on "Add Project to System" which triggers the software program to create a directory with the name of the Project Workspace within the chosen RAID array or Storage Volume.

In accordance with this aspect of the invention shown with respect to FIG. 4, and with reference to the example annotated schematic of a RAID directory listing provided hereinbelow, the display interface 305 presented to the administrator enables entry of the name of the new Project Workspace (e.g., "SomeProject") in entry field; and, causes for display via a "RAID Array" drop down box a list of all RAID arrays connected to the system, in addition to indicating how much space is available on each array, and, in addition, permit the administrator to choose a RAID array. Additional functionality enabled via the interface 305 of FIG. 4, is the ability for a administrator to create a directory on the array called, for example, "SomeProject_1", and create a subdirectory within "SomeProject_1" called, for example, "OMFI MediaFiles".

Referring back to FIG. 3, selection of the tab 208 generates an interface 308 now such as shown in FIG. 5 enabling the addition of users to the Project Workspaces. Adding users to a Project Workspace triggers several actions by underlying the computer program. For instance, inside the Project Workspace directory, the computer program creates a User Directory which specifically corresponds with both the User's name and the Project Workspace name. The computer program further creates a Windows (Samba) Network Share (and in some cases also a Macintosh AFP Share) that corresponds to the User and the Project Workspace, such that when the User logs on to the server with his/her Username and Password, the Network share will be visible in a list of accessible network resources—thus giving each user an opportunity to mount each of his/her Network Shares (the number of shares depending on the number of Project Workspaces of which he/she is a member) and use them as if they were hard drives attached to the local client machine. In one example embodiment of the invention, the Network Shares are configured in such a way that a particular user's Network Shares are only visible to a user who is logged on the server as that user. Thus, users are not distracted by seeing the Share names of other users—Shares that are only authorized to be accessed by the user who corresponds to the Share.

Thus, in accordance with this other aspect of the present invention, the software of the present invention provides, via the Graphical User Interface, the ability to add the user to a currently existing Project Workspace. Thus, as shown in FIG. 5, an administrator may select the name of the from the User Name drop down box; and, select a "Project Name" from a drop down box that provides a list of all Project Workspaces (Media Spaces) that are selectable, for example, by highlighting a Project Workspace; and, provides a button to initiate the action to add the new user to the Project Workspace. Although not shown, in a further implementation of the software, this feature will additionally enable the administrator to select the type of NLE system that will be used and then, inside the main Parent Project folder, set up the proper directories for that user and the type of NLE he/she will be using.

The virtualization system described in applicant's co-pending United States Patent Publication No. 2006/0184673 in which a symbolic link to each media file is created for each user or each workstation and then presented to the user or workstation in directories that are unique to each user or workstation—thereby giving each user or workstation access to a common pool of files while letting each user or workstation create and control its own media database files referencing those media files, requires a "share" function that would move real files from a user's directory to a higher-level directory that was beyond the direct touch of an actual non-linear workstation, and automatically replace the real media files with symbolic links so that the workstation continued to see those media files. Further, a "refresh" function creates symbolic links in a workstation's private directory to files that had been shared by other workstations. Sharing and refreshing and the automatic creation of symbolic links to each media file allows each non-linear workstation to effectively see the same files via their own unique directories that could thus contain unique media database files for each workstation.

However, the embodiments described in applicant's co-pending United States Patent Publication No. 2006/0184673 require pro-active user interaction, i.e., users have to "share" and "refresh"—in order for multiple workstations to see and use and have access to the same files. Furthermore, each workstation has to create and maintain its own media database files and when the "refresh" function is run, seeing new links to files that had been shared by other workstations would cause the NLE application, e.g., Avid, on a workstation that had been "refreshed" to scan the new files that were suddenly in its view. While the "share" and "refresh" scheme give users control over when their workstations see new files that had been created and shared by others—and thus control over when their Avid application see the new files and scanned them—the need to scan files could become a significant interruption to work.

In the current invention, a solution is provided that implements symbolic links (e.g., a file that redirects access to the location of an original file) to create a new and improved scheme for storing certain type of formatted media files, e.g., Avid MXF-format media files.

That is, rather than creating symbolic links to each individual media file, an alternative technique is implemented that automatically creates symbolic links to the subdirectories of Avid's "MXF" directory and that automatically gives the "symlinked" directories advantageous names that allow multiple non-linear workstations to simultaneously see and use the same media files without any of the inconveniences mentioned hereinabove.

In its simplest form, an automated system is set up in which each workstation sees its own real "MXF/1" directory, but sees everybody else's "/MXF/1" directories via "directory symlinks". The directory symlinks must be given different names from the directories they point to—because it is not possible for there to be more than one directory or directory symlink with the same name (e.g., "1") in a single folder. In an example embodiment, a naming scheme is chosen that is not at all obvious and that works very advantageously with NLE programs such as provided by Avid Technologies.

The system and methodology is now described as follows: For exemplary and non-limiting illustrative purposes, it is assumed that there are 4 workstations (edit1, edit2, edit3, edit4). Further it is assumed that all of these workstations have been given access to a volume on the storage device called "new_way", for example, and that a unique view of the volume has been created for each of the workstations and exported as a Samba and/or Apple Filesharing Protocol (AFP) network share by the name of "new way". When each workstation connects to the network share "new way", the workstation will actually be seeing its own unique view of the "new way" volume.

On the physical storage device, the layout of directories appears as follows:

```
/RAID_1/AvidMXF/new_way
    /edit1_new_way        {root level of network share only
                           visible to workstation "edit1"}
        /Avid MediaFiles
            /MXF
                /1    {real directory}
                    mediafile1.mxf
                    mediafile2.mxf
                    mediafile3.mxf
                    Avid MediaDabase Files
                /edit2_1 {symlink to edit2's "1" directory}
                /edit3_1 {symlink to edit3's "1" directory}
                /edit4_1 {symlink to edit4's "1" directory}
    /edit2_new_way        {root level of network share only
                           visible to workstation "edit2"}
        /Avid MediaFiles
            /MXF
                /1    {real directory}
                    mediafile4.mxf
                    mediafile5.mxf
                    mediafile6.mxf
                    Avid MediaDabase Files
                /edit1_1 {symlink to edit1's "1" directory}
                /edit3_1 {symlink to edit3's "1" directory}
                /edit4_1 {symlink to edit4's "1" directory}
    /edit3_new_way        {root level of network share only
                           visible to workstation "edit3"}
        /Avid MediaFiles
            /MXF
                /1    {real directory}
                    mediafile7.mxf
                    mediafile8.mxf
                    mediafile9.mxf
                    Avid MediaDabase Files
                /edit1_1 {symlink to edit1's "1" directory}
                /edit2_1 {symlink to edit2's "1" directory}
                /edit4_1 {symlink to edit4's "1" directory}
    /edit4_new_way        {root level of network share only
                           visible to workstation "edit4"}
        /Avid MediaFiles
            /MXF
                /1    {real directory}
                    mediafile10.mxf
                    mediafile11.mxf
                    mediafile12.mxf
                    Avid MediaDabase Files
                /edit1_1 {symlink to edit1's "1" directory}
                /edit2_1 {symlink to edit2's "1" directory}
                /edit3_1 {symlink to edit3's "1" directory}
```

As current Avid NLE applications function to generally only capture or render MXF-format media files into a "1" directory, in the scheme described herein, each workstation is assigned its own "1" directory. However, with the software virtualization technique of the present invention that utilizes symbolic links, each user's "1" directory is seen by other users not as "1" but as another name, e.g., "edit1_1". In fact, further to this embodiment, there is applied a naming convention such that a user "edit2" will now sees "edit1's" "1" directory as "edit1_1, for example. That is, in one example embodiment, the naming convention applied it has the form "username+underscore+the real directory name. It is understood that other naming conventions are possible as long as the NLE application that has to see a name, e.g., Avid, causes it to not try to modify the database contained within. If each user requires a "1" folder, the system can not have more than one "1" folder in a space. Thus, by transforming the names in other user's directories, each user may be given his/her own "1" folder that can also be seen by other users (but by a different name). The same applies for "2" folders. And so on. A naming transformation is required and the example naming convention form has special advantages because the Avid NLE application treats it differently than a directory with just numbers. In fact, in a Maintenance Mode of operation, to be described herein below, the symlinks are transformed again in accordance with another naming convention, e.g., according to an example format: UserID+directory name–i.e., UserID=00501, for example, and Directory Name=24, for example, to thus obtain a symlink called 0050124. Avid's NLE application will treat that as a directory whose media database can be modified.

The novel use of symbolic links described herein solves many problems inherent in having two or more NLE workstations access a common pool of media files. First, it allows each workstation running an Avid NLE application, for example, to capture and render MXF media files into its own isolated space, i.e., the "the user's own "1" subdirectory of the MXF directory, which is crucial for ensuring that two workstations do not attempt to modify a media database file at the same time, an action which is likely to cause data corruption. Second, it allows workstations to access a unified storage volume that includes media files created by multiple users and that can be mounted with a single "network volume name" or "drive letter". Third, because Avid NLE applications see the contents of directories whose names include non-numeric characters but the Avid applications will not attempt to modify the media databases inside such directories, the symbolic link scheme makes it possible for each workstation to freely add or remove media files from its own "1" folder without causing interruptions or problems for other workstations—because from the perspective of the other workstations, the changes occur in directories with non-numeric characters.

As described, when a given "1" directory reaches a certain number of files, the Avid NLE application may rename that directory to "2" and create a new "1" directory and now fill that fresh "1" directory with additional files. Alternately, Avids NLE application may leave the existing "1" directory and begin putting files in a "2" directory. Both of these scenarios are addressed by the automated system of the invention. That is, if a "1" directory is renamed, the names of the symlinks seen by other workstations are automatically updated (for example, if edit1's "1" directory were renamed by Avid to "2", other workstations would now automatically see that directory as "edit1_2" instead of "edit1_1"). Similarly, if Avid (or a user) were to create a "2" directory in one workstation's view of a storage volume, the system automatically creates appropriate symlinks to be seen by other workstations in their view of the volume.

If a user were to create a directory name that goes beyond just numbers—for example, a user might decide to change the name of a "1" directory to "tapes1to50" to help organize media files and prevent an Avid NLE application from putting more files there—the system will additionally automatically create appropriate symlinks so that other workstations see the same change.

In the scheme described above, the directories belonging to each workstations—that is the "1" or "2" directories, or directories that have been given meaningful names such as "tapes1to50"—are generally only writable by that workstation and are "read only" for other workstations. Having such write protection prevents any workstation from transferring files into another workstations' "1" or "2" directory, or deleting files from those directories—changes which would otherwise cause the workstation corresponding to the "1" or "2"

directory to notice that something was added or deleted and thus cause the workstation to rescan the files to correct the media database file.

FIGS. 15-31 of Applicant's co-pending United States Patent Publication No. 2006/0184673, incorporated by reference as if fully set forth herein, particularly describe interfaces that provide access to tools that enables functionality for managing the centralized storage system and further that provides the ability to create a special environment where non-linear video editing Projects can be shared by multiple editors such that: 1) the work of each editor is easily accessible to colleagues on a Read Only basis—that is, it can be viewed and duplicated, but not changed; 2) editors working in a Shared Project can completely hide some work from colleagues; 3) editors each get their own customized view of the Shared Project; 4) editors can cede Write Authority to colleagues by moving their work to an unprotected area; and, 5) each editor maintains his/her own Settings files for the project, as well as statistics and trash bins.

Figure 6:
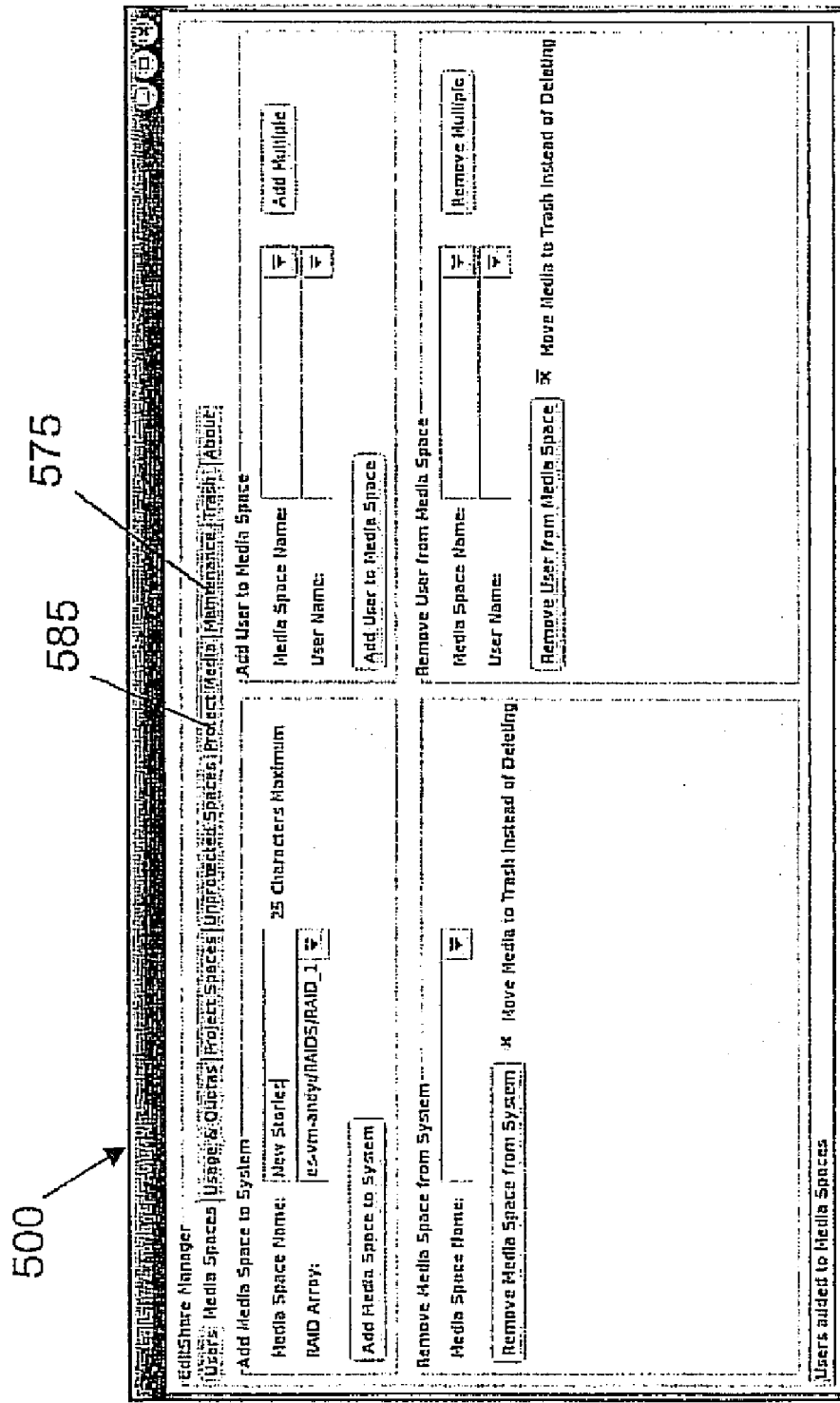
FIG. 6 depicts an example screen interface 500' via which further functionality for enabling management of the centralized shared storage system is presented for user selection.

In a further aspect of the invention, additional functionality is provided to enable a single workstation to have writing and/or deleting authority over all workstations' directories in a given storage volume. For instance, as shown via the example screen interface 500 of FIG. 6 depicting further functionality for enabling management of the centralized shared storage system, a user is enabled to create a "virtual volume" called "News Stories" on the storage subsystem. The interface 500 provides a "Maintenance Mode" feature embodied as a user-selectable tab 575 that enables a single workstation to delete unwanted files from anywhere in the storage volume. Taking into account the way NLE applications such as provided by Avid Technologies currently function, in order to have this maintenance feature, several additional system functions and corresponding method steps must be implemented. That is, in response to selecting the "Maintenance Mode" feature via user-selectable tab 575 the single workstation user or administrator may: 1) implement maintenance mode functionality such as enabling a single workstation or username to perform maintenance on a selected storage volume; 2) in the view of that single workstation or user, temporarily changing the names of the symlinks of all other workstation's directories to "numeric-only" names (for example, the symlink "edit1_1" might be changed to "1234") so that the NLE application, e.g., Avid's NLE, treat the contents of the directory as modifiable; and 3) change the permissions of the all workstations' directories within the storage volume so that the selected workstation now has exclusive write access to all existing media directories. Other workstations might continue to have read only access, but it is important that the other workstations not make any modifications to directories that could be modified by the chosen workstation that is doing the maintenance. Optionally, a duplicate set of "hard links" may be created for every media file in a Volume, providing a second backup reference to each media file. (In Linux and Unix, "file names" are basically "hard links" that point to "physical addresses" in a file system. Thus, giving a file a name is to give it its first "hard link".)

That is, as described herein above pertaining to a new directory and file structure in the new scheme for storing AvidMXF files, a Maintenance Mode is provided that enables changing the names of the symlinks in one user's directory, i.e., the user who is getting Maintenance authority. Thus, prior to operating in the Maintenance Mode, the user or workstation "edit3" has a view of the "Media Space that looks as follows:

```
/edit3_new_way    {root level of network share only visible to
                   workstation "edit3"}
    /Avid MediaFiles
        /MXF
            /1    {real directory}
                  mediafile7.mxf
                  mediafile8.mxf
                  mediafile9.mxf
                  Avid MediaDabase Files
            /edit1_1 {symlink to edit1's "1" directory}
            /edit2_1 {symlink to edit2's "1" directory}
            /edit4_1 {symlink to edit4's "1" directory}
```

When put into Maintenance Mode, the symlink directories change as in the following example:

```
/edit3_new_way    {root level of network share only visible to
                   workstation "edit3"}
    /Avid MediaFiles
        /MXF
            /1    {real directory}
                  mediafile7.mxf
                  mediafile8.mxf
                  mediafile9.mxf
                  Avid MediaDabase Files
            /00532001 {symlink to edit1's "1" directory}
            /00536001 {symlink to edit2's "1" directory}
            /00538001 {symlink to edit4's "1" directory}
```

Thus, the system has automatically changed "edit1_1" to "00532001" and "edit2_1" to "00536001" and "edit4_1" to "00538001"—each new symlink name corresponding to the Linux User's UID plus the real directory name. When leaving Maintenance Mode, the original symlink names are again established.

Figure 7:
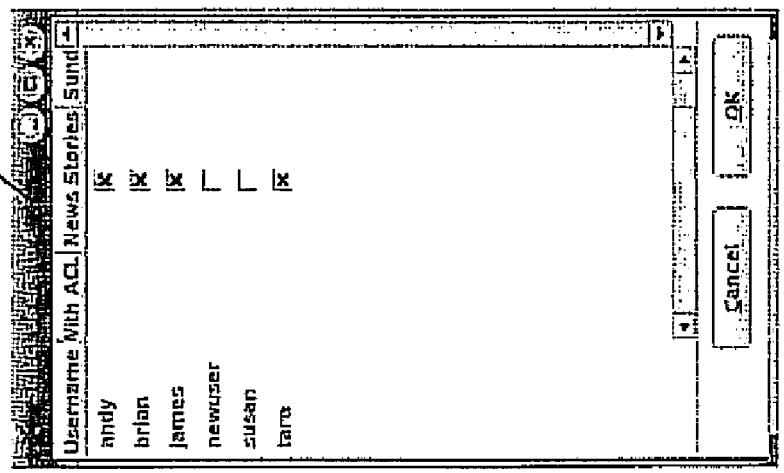
FIG. 7 depicts an example user interface dialogue box 580 via which an administrator may select those users and/or workstations that will be given maintenance authority according to the invention.

FIG. 7 depicts an example user interface dialogue box 580. Via the dialogue box 580, an administrator may select those users and/or workstations that will be given access to the "Media Space" or "virtual volume". Particularly, via the interface dialogue box 580 shown in FIG. 7, selected users/editors may be added to the "News Stories" virtual volume. Only these users will have access to this virtual volume, and each user will get his/her own subdirectory within MXF directory created by Avid's NLE application.

Figure 8:
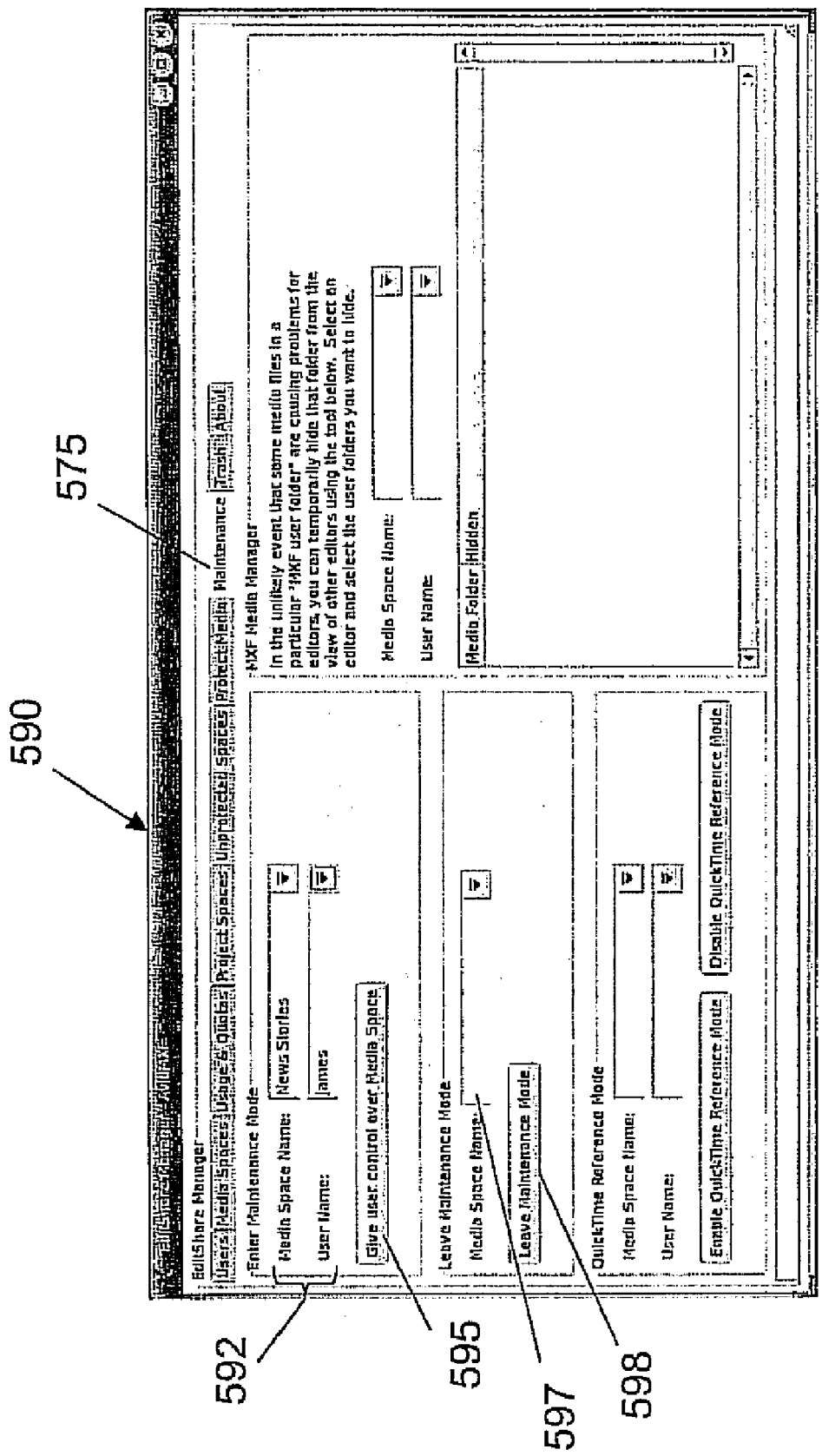
FIG. 8 depicts an example interface 590 generated and presented for display in response to selecting the Maintenance tab 575 via interface 500' of FIG. 18.

FIG. 8 depicts an example interface 590 generated and presented for display in response to selecting the Maintenance tab 575 via interface 500 of FIG. 6 that enables an Administrator to place a Media Space (Project Workspace) into the Maintenance Mode. An administrator may select the name of the Media Space (e.g., "News Stories") and a user (e.g., james) via drop down lists and entry fields 592, for example. Selecting button 595 initiates functionality for providing the selected user control over the selected Media Space—thus, allowing a single user to be able to delete or modify files created by ANY member of the Media Space. That is, once a workstation or user is given Maintenance Mode authority, the chosen workstation or user is able to safely use any of the maintenance features included with NLE applications to delete, rename, or otherwise modify files without risk of conflicts with other workstations. After maintenance has been completed, the administrator may take the selected volume out of maintenance mode, and return permissions and symlink names to their former state. For example, this functionality is initiated when an administrator selects the Media Space to be removed via drop down list 597, and, selects a button 598 for removing Media Space from the Maintenance Mode.

In an additional embodiment a duplicate set of "hard links" may be created for every media file in a Volume, providing a second backup reference to each media file. Optionally, if a duplicate set of "hard links" was created for every media file, a system response for exiting of Maintenance Mode will initiate the triggering of a comparison of what was in the Volume before versus what was there after. For instance, any file that now only has a single "hard link" might be presumed to have been deleted from the volume by the workstation doing maintenance. This information can then be used to move any second remaining hard link to the "Trash"—thus providing a mechanism for restoring files that were deleted during Maintenance Mode.

An example of how the hardlink feature can be implemented is as follows: In addition to the user views of the directories layout referenced herein above and the Maintenance User's view referenced above having modified symlink directories, an additional set of directories can be created in a "new_way" directory, e.g.,

```
/backup_new_way    {root level of a directory not visible
                    to any workstation}
     /Avid MediaFiles
          /MXF
               /edit1_1                        {real directory}
                         mediafile1.mxf        {extra hardlink}
                         mediafile2.mxf        {extra hardlink}
                         mediafile3.mxf        {extra hardlink}
               /edit2_1                        {real directory}
                         mediafile4.mxf        {extra hardlink}
                         mediafile5.mxf        {extra hardlink}
                         mediafile6.mxf        {extra hardlink}
               /edit3_1
                         mediafile7.mxf        {extra hardlink}
                         mediafile8.mxf        {extra hardlink}
                         mediafile9.mxf        {extra hardlink}
               /edit4_1                        {real directory}
                         mediafile10.mxf       {extra hardlink}
                         mediafile11.mxf       {extra hardlink}
                         mediafile12.mxf       {extra hardlink}
```

Figure 9:
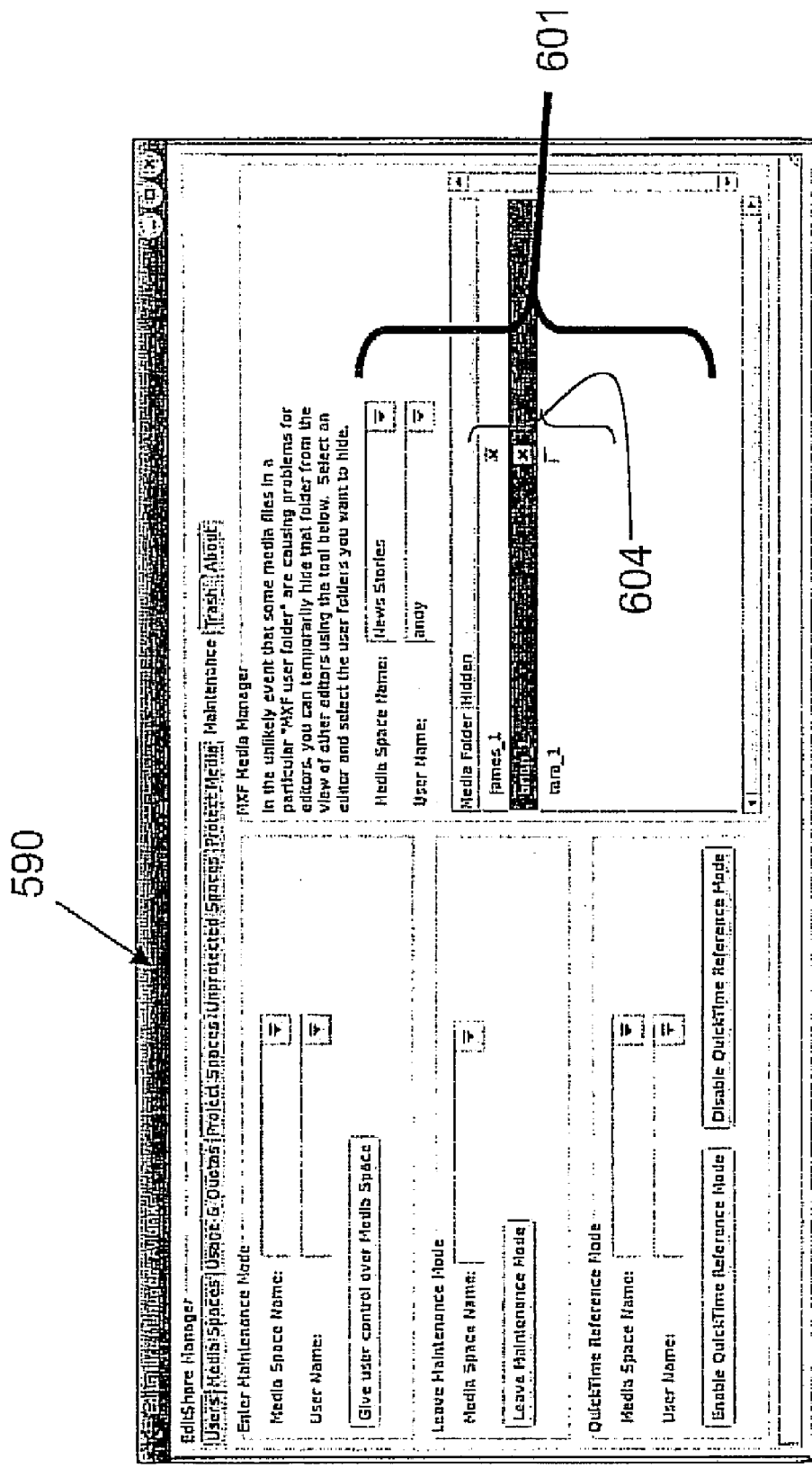
FIG. 9 depicts a user interface enabling an Administrator or user to select certain "user folders" that are to be hidden from the selected user's view of an MXF directory structure of a corresponding selected Media Space.

Furthermore, as shown in the example interface 590 shown in FIG. 9, via a user interface portion 601, there is generated for display an MXF directory tree for a particular Media Space. Via this interface, an Administrator can select a Media Space and select a user, and select certain "user folders" 604 that are to be hidden from the selected user's view of the MXF directory from that user's workstation.

In sum, via the Maintenance Mode functionality provided by the present invention, the following actions may be performed: 1) changing the names of the directory symlinks in a single chosen user's view of the Media Space such that that user's Avid NLE application will be able to delete or modify media files and modify media databases if it is asked to perform a function that would require such actions. This is because the symlink names originally set up prevent Avid from trying; 2) changing the actual permissions and ACLs on the files and directories so that when the chosen user's Avid NLE application attempts to delete or modify a file or a database, the Linux permissions will allow it to do so; 3) disable write access to existing media directories to all users except the chosen maintenance user, to prevent a situation where two or more users attempt to modify a media database file simultaneously; and, 4) before allowing a Media Space to be put into Maintenance Mode, checking to make sure nobody is capturing or rendering files to the Media Space so as not to thwart the completion of that action.

Additionally, in a further aspect of the invention, functionality is provided to protect media files that have been captured or rendered or otherwise created by a workstation so that no workstation can delete those files—even the workstation that created the files. For instance, as shown via the screen interface 500 of FIG. 6, a "Protect Media" feature is provided and embodied as an administrator-selectable tab 585 that enables the server to protect the media files in the chosen user's or workstation's directory of a chosen "media space" or "virtual volume" so that the media files that have been captured or rendered or otherwise created there by that user or workstation cannot be deleted—even the user or workstation that created the files. The idea of "Protection Mode" is to prevent existing files from being deleted or modified but still allow new files to be created or added by the authorized user. The "Protection Mode" functionality accessible via interface 500 of FIG. 6, requires implementation of several additional system functions and corresponding method steps including, but not limited to: 1) functionality enabling user selection of one or more Storage Volumes to be Protected, and one or more Usernames or Workstation Names whose media is to be protected; 2) automated system functionality to automatically change file and directory permissions (i.e., through changes in Access Control Lists) such that existing files in relevant directories can no longer be deleted, but new files can still be created. Thus, for example, in the case of Avid NLE applications, it is important to not protect the media database files, as those must get continually modified as a workstation adds new media files to a directory; and 3) functionality for enabling user selection of one or more Storage Volumes to be taken out of Protection Mode, and selection of one or more Usernames or Workstation Names whose media files are to be UnProtected.

Figure 10:
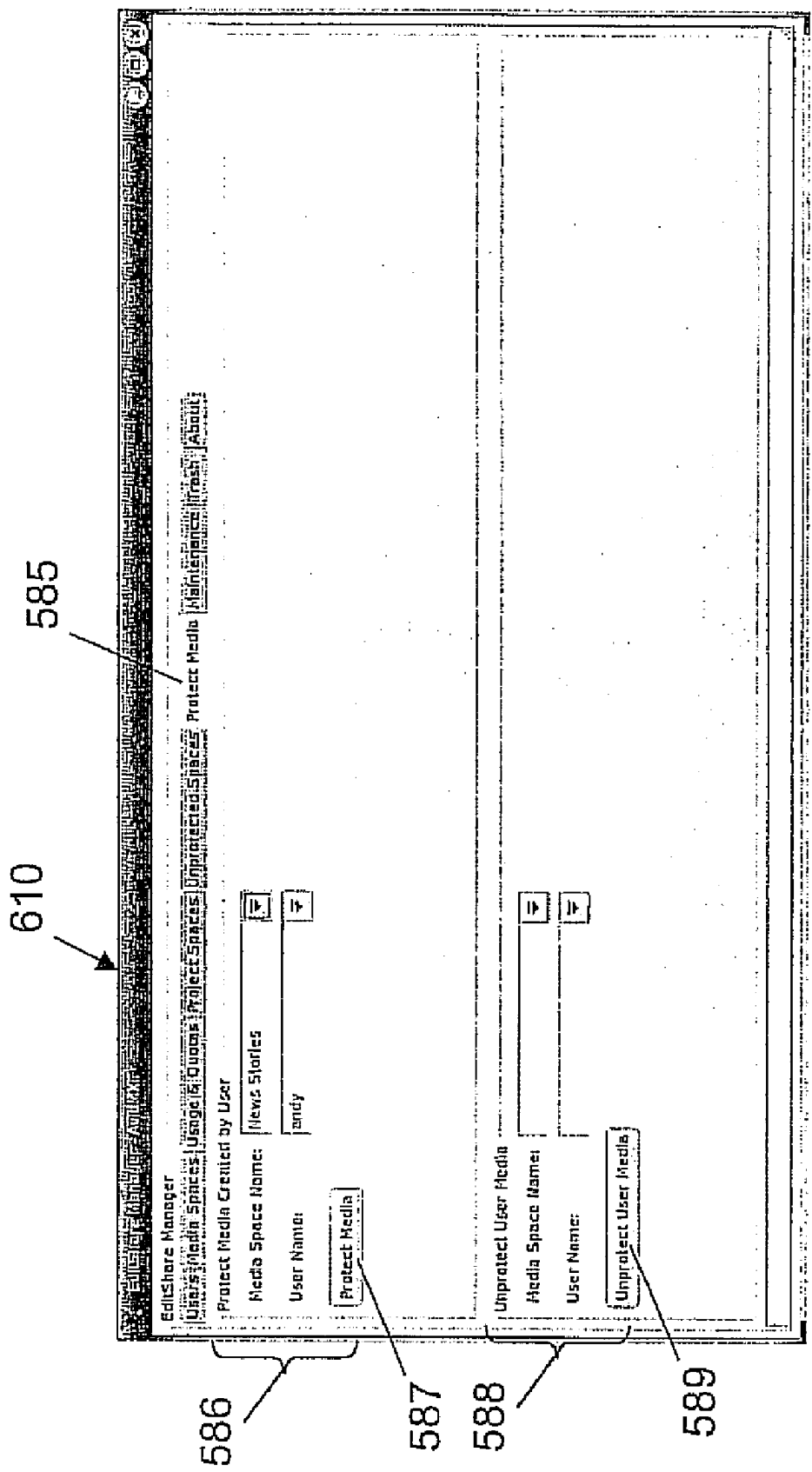
FIG. 10 depicts an example user interface 610 generated and presented for display in response to selection of the "Protect Media" tab 575 via interface 500' of FIG. 18.

Referring now to FIG. 10, there is depicted an example user interface 610 that is presented for display in response to selection of the "Protect Media" administrator selectable tab 585 via the screen interface 500 of FIG. 6. The example administrator interface 610 particularly enables a user such as an Administrator to protect the media files of a specified user by selecting the Media space name and a user name via the drop down list structures 586 provided via the user interface 610. Upon selection of the protect media button 587, any existing media files become protected from deletion or renaming or any other modification. Similarly, the example user interface 610 enables a user such as an Administrator to remove protection of the media files of a specified user by selecting the Media space name and a user name via the drop down list structures 588 provided. Upon selection of the protect media button 589, a user is free to delete or otherwise modify files in his/her own subdirectory once Protection is removed.

In sum, via the Protect Mode functionality provided by the present invention, the following actions may be performed: changing the Linux permissions, ownerships, and ACLs such that a chosen User cannot delete, modify or otherwise change any existing Media file in his/her own subdirectories of the Media Space (e.g., his/her own "1" folder); and, 2) allowing the chosen user to continue adding new files to his/her own subdirectories of the Media Space (e.g., his/her own "1" folder);

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described my invention, what I claim as new, and desire to secure by Letters Patent is:

1. A method for storing digital audio and video media files in a system having a computer server that is in communication with a means for storing said media files, and that is in communication with at least two users having computing devices, said method comprising:
   creating a directory structure on said storage means for hierarchically organizing said digital media and other data files;
   generating in said directory structure a User Directory that corresponds to each said at least two users that is capable of accessing said media files, and through which one of said at least two users can store actual digital media files;
   capturing and rendering of media files of a predetermined format into said directory structure, and storing said media files in one or more single sub-directory levels below an isolated root level of said directory structure;
   automatically creating for each subdirectory of said isolated route level directory structure, a corresponding symbolic link to the actual sub-directory location for one or more other individual independent users, and placing said links inside each other's corresponding User Directory, and,
   re-naming said symbolic links to the actual sub-directory locations of said other individual independent users to a name different from the directory where the actual digital media files are stored;
   whereby, via said links, a user is permitted indirect access to all actual digital media files that are stored in the directory on said storage means, while making said digital media files appear to be located in a directory that is a different name from the directory where the actual digital media files are stored.

2. The method as claimed in claim 1, further comprising automatically re-naming the symbolically linked directories to allow multiple user workstations to simultaneously see and use the same media files of each sub-directory location.

3. The method as claimed in claim 1, further comprising: providing maintenance mode functionality comprising:
   modifying the permissions on files and directories so that a single chose user can delete or otherwise modify files in all user directories of the virtual volume; and,
   renaming the symbolic directory links a further instance for the chosen user.

4. The method as claimed in claim 1, further comprising: providing protect mode functionality comprising:
   changing the ownership of files and/or permissions and/or access control lists such that no user can delete existing files.

5. The method as claimed in claim 1, wherein said media files of predetermined format include one or more of: *.mfx, *.omf, *.aif, and *.wav files.

6. In a computing system executing a video non-linear editing (NLE) application and including a shared media storage device for storing media files, said computing system permitting access to said NLE application by multiple users via user devices connected over a network, and wherein all media files, for each user, are stored in a given media storage device volume in a predetermined sub-directory level down from a root level of a networked volume drive for access by said executing application, and each user via that user's device accesses its own view of media files stored by that user at a corresponding predetermined sub-directory level, said NLE application adapted to create, at said predetermined directory level, one or multiple folders for storing media files, and said folders created according to a pre-set naming convention, a system for sharing a media space for said multiple users, said system comprising:
   means for generating, at a given user's device accessing said NLE application, a User Directory folder corresponding to each other of said at least two users at said predetermined directory level, and through which each respective other of said at least two users stores actual digital media files via their respective user devices;
   means for generating a symbolic link, for storage within each respective User Directory folder, said symbolic link for specifying a reference to the corresponding actual predetermined sub-directory for each said other at least two users, said symbolic links to the actual sub-directory locations of each said other at least two users being re-named to a name different from the pre-set naming convention of said other at least two user directories where the actual digital media files are stored,
   whereby, via said symbolic links, a user is permitted indirect access to all actual digital media files that are stored in the directory on said storage means via that user's view of the volume, while making said digital media files appear to be located in a directory that is a different name from the directory where the actual digital media files are stored.

7. The system for sharing a media space as claimed in claim 6, further comprising
   means for automatically re-naming the symbolically linked directories to allow multiple user workstations to simultaneously see and use the same media files of each predetermined sub-directory location.

8. The system for sharing a media space as claimed in claim 6, further
   means for modifying the permissions on files and sub-directories so that a user can delete or otherwise modify files in all User Directories of the volume, said symbolic links provided in a user directory being automatically further renamed for the given user.

9. The system for sharing a media space as claimed in claim 6, further comprising:
   means for preventing users from deleting existing files by changing the ownership of files and/or permissions and/or access control lists.

10. The system for sharing a media space as claimed in claim 6, wherein said media files of predetermined format include one or more of: *.mfx, *.omf, *.aif, and *.wav files.

11. A program storage device readable by a machine, tangibly embodying a program of instructions executable by the machine to perform method steps for storing digital audio and video media files in a system having a computer server that is in communication with a means for storing said media files, and that is in communication with at least two users having computing devices, said method steps including the steps of:
   creating a directory structure on said storage means for hierarchically organizing said digital media and other data files;
   generating in said directory structure a User Directory that corresponds to each said at least two users that is capable of accessing said media files, and through which one of said at least two users can store actual digital media files;
   capturing and rendering of media files of a predetermined format into said directory structure, and storing said media files in one or more single sub-directory levels below an isolated root level of said directory structure;

automatically creating for each subdirectory of said isolated route level directory structure, a corresponding symbolic link to the actual sub-directory location for one or more other individual independent users, and placing said links inside each other's corresponding User Directory; and, re-naming said symbolic links to the actual sub-directory locations of said other individual independent users to a name different from the directory where the actual digital media files are stored, whereby, via said links, a user is permitted indirect access to all actual digital media files that are stored in the directory on said storage means, while making said digital media files appear to be located in a directory that is a different name from the directory where the actual digital media files are stored.

12. The program storage device readable by a machine as claimed in claim 11, further comprising: automatically re-naming the symbolically linked directories to allow multiple user workstations to simultaneously see and use the same media files of each sub-directory location.

13. The program storage device readable by a machine as claimed in claim 11, further comprising: providing maintenance mode functionality comprising:

modifying the permissions on files and directories so that a single chose user can delete or otherwise modify files in all user directories of the virtual volume; and, renaming the symbolic directory links a further instance for the chosen user.

* * * * *